United States Patent [19]
Parker et al.

[11] Patent Number: 5,558,495
[45] Date of Patent: Sep. 24, 1996

[54] ELECTROMAGNETIC HEATING DEVICES, PARTICULARLY FOR RAM AIR TURBINES

[75] Inventors: Barry J. Parker; Alexander Krinickas; John D. Stilwell, all of Rockford; Neil L. Brown, Stillman Valley, all of Ill.

[73] Assignee: Sundstrand Corporation, Rockford, Ill.

[21] Appl. No.: 161,765

[22] Filed: Dec. 2, 1993

[51] Int. Cl.$^6$ ............................................. F01D 5/08
[52] U.S. Cl. .................. 416/95; 415/177; 219/635; 219/618; 244/134 D
[58] Field of Search ............... 416/245 R, 95; 415/177; 219/635, 631, 618; 244/134 D, 134 E, 134 R

[56] References Cited

U.S. PATENT DOCUMENTS

| | | | |
|---|---|---|---|
| 2,488,392 | 11/1949 | Forsyth | 170/160.23 |
| 2,547,934 | 4/1951 | Gill | 230/122 |
| 2,701,092 | 2/1955 | Henshaw | 230/122 |
| 2,709,892 | 6/1955 | Martin | 60/39.09 |
| 3,455,396 | 7/1969 | Cummings | 416/95 |
| 4,486,638 | 12/1984 | deBennetot | 219/10.51 |

FOREIGN PATENT DOCUMENTS

| | | | |
|---|---|---|---|
| 2453579 | 10/1980 | France | 219/631 |
| 4149951 | 11/1979 | Japan | 219/618 |
| 7144839 | 9/1982 | Japan | 219/618 |
| 0545305 | 5/1942 | United Kingdom | 244/134 D |
| 625299 | 6/1949 | United Kingdom . | |

*Primary Examiner*—Edward K. Look
*Assistant Examiner*—Mark Sgantzos
*Attorney, Agent, or Firm*—Ryan M. Fountain; Lawrence E. Crowe

[57] ABSTRACT

Apparatus is provided for creating heat by electromagnetic induction between relatively rotating components. In RAT applications, part of the nose cone (34) is formed from electrically conductive material (106) which is in thermally conductive relation to the nose cone exterior. A magnetic field is created by components (60) that are spaced apart from the electrically conductive material and relatively rotatable with respect to that material. The electrically conductive material intersects the magnetic field, at least in part, such that eddy currents are created in the electrically conductive material by relative rotation with respect to the magnetic field. These eddy currents create heat which is conducted to the exterior surface of the RAT nose cone. Preferably, the magnetic field is created by a pair of spaced-apart permanent magnets (60) mounted on a support plate (62) inside the RAT hub (28) and immediately behind the nose cone. The effect of the magnetic field in heating the nose cone can be increased by use of magnetically permeable material to form the support plate and/or part of the nose cone adjacent or integral with the electrically conductive material.

24 Claims, 8 Drawing Sheets

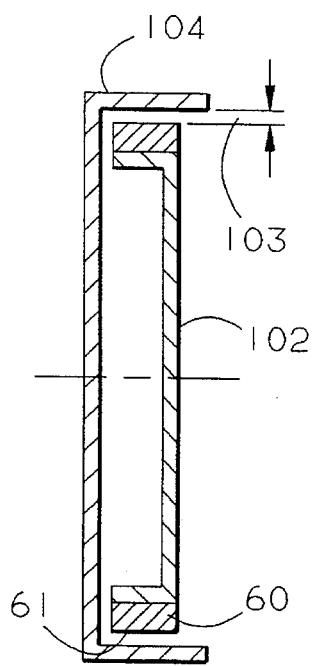
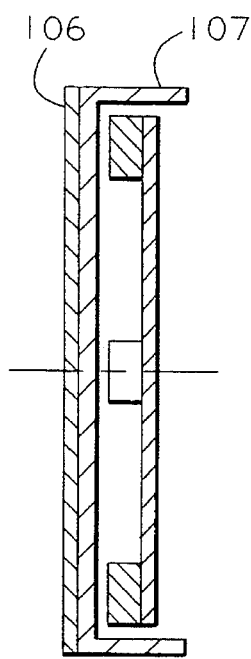
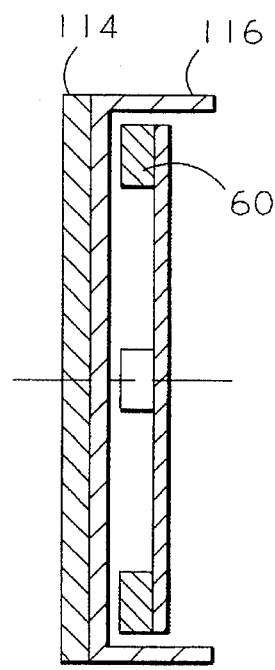
FIG.9  FIG.10  FIG.11
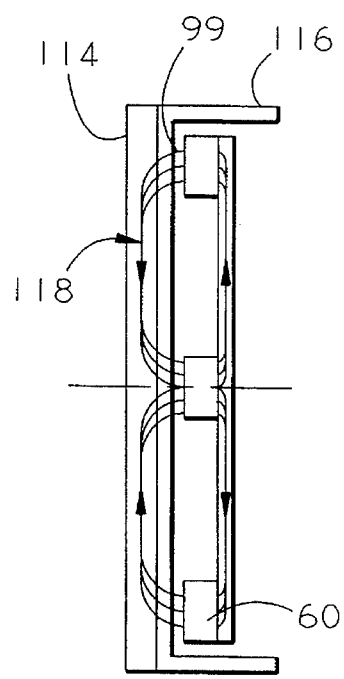
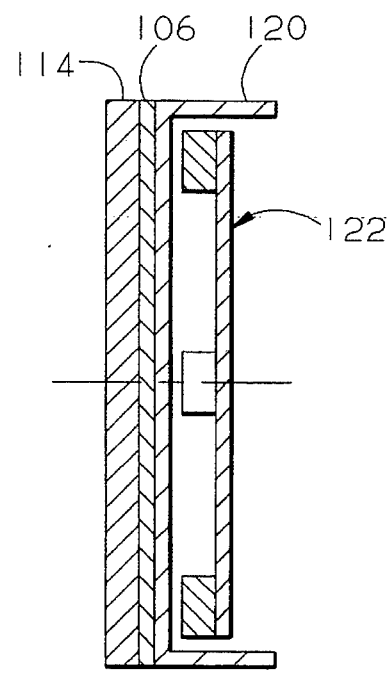
FIG.11A  FIG.12

ELECTROMAGNETIC HEATING DEVICES, PARTICULARLY FOR RAM AIR TURBINES

FIELD OF THE INVENTION

Generally speaking, the present invention provides methods and apparatus for creating heat by electromagnetic induction between relatively rotating components. This invention has particular application to devices for preventing and/or removing ice build up on structures of operating aircraft, such as ram air turbines.

BACKGROUND OF THE INVENTION

It is well known that during the course of normal operations, aircraft can encounter atmospheric conditions which cause an accretion of ice to develop on various aircraft surfaces or structures, particularly along leading edges in the airstream. In addition to detrimentally increasing aircraft weight, this ice can actually cause damage to some aircraft structures, such as propulsion engines, ram air turbines (RATs) and wingtip vortex turbines. For example, if ice builds up on the nose cone of a RAT and then breaks off in mass or in large chunks, the RAT blades can be bent or broken and/or an out of balance condition created in the RAT.

Previous aircraft have been equipped with anti-icing and/or de-icing equipment capable of operation during flight. Various different methods have been employed by this equipment, including ducting hot liquids or engine bleed air to the affected surfaces, embedding electrical resistance heaters in the affected surfaces, and using mechanical shields or inflatable boots adjacent the affected surfaces.

While this prior equipment has performed satisfactorily for some of the surfaces affected by icing, in other instances it has not. For example, applying such equipment to nose cones of rotating and non-rotating aircraft structures has been found to be unsatisfactory and/or impractical due to difficulties encountered in providing ducting, electrical connections, or mechanical linkages between the nose cone and the source of heat, air or power needed to prevent or remove ice. To better understand these difficulties, specific illustration is provided with respect to a typical RAT.

Aircraft RATs are often employed as emergency power generators, usually in stowage until use is required. As an emergency system, reliability and durability in the emergency environment is of critical importance. RATs need to be quickly operable in a wide range of altitudes and in various weather conditions. Thus, in low altitude or low airspeed deployment, as for example, immediately after take off, start up drag torque on RAT blade rotation should be minimized so as to avoid requiring larger blades for fast start up. Moreover, since little or no additional or supplemental power may be available to the RAT during aircraft emergencies, RATs should ideally be self-sustaining or very efficient in utilization of what supplemental power is needed. Further, since aircraft emergencies are relatively rare occurrences and RATs spend virtually their entire useful life as "excess baggage", it is often important that RATs be lightweight, compact in size and inexpensive in order to reduce aircraft cost and operating expenses.

In seeking to prevent ice build up on a RAT when it is deployed out of stowage, it becomes readily apparent that many of the anti-icing/de-icing apparatus used with respect to other aircraft surfaces would substantially increase the weight and cost of the RAT as well as detrimentally affect RAT reliability and power generation performance. For example, one type of arrangement that has been suggested for use in related structures includes electrical resistance heating elements. U.S. Pat. No. 2,488,392 shows the use of such devices in propellers of the aircraft main power plant. In that case, a dynamoelectric device is placed within the propeller hub to provide electric current to blade pitch control motors and to the heating elements located in the leading edges of the propeller blades and the spinner. The electric current is transferred to the heating elements, which are subject to rotation with respect to the dynamoelectric device, through the use of slip rings. However, slip rings have generally been found to be undesirable for use in equipment, such as RATs, which require high reliability and long term maintenance free operation due to the inherent wear of the slip rings incident with their operation and higher start up drag torque.

Further, RATs generally employ a less complex mechanical actuation and governing device to adjust blade pitch. Including the dynamoelectric device of the '392 patent would, thus, significantly increase the weight and cost of a RAT, even if slip ring reliability and start up drag torque could be simultaneously improved. Using existing aircraft power sources instead of that dynamoelectric device to provide current to the heating elements is likewise undesirable because of power conversion losses and the limited or non-existent availability of that supplemental power during emergencies.

Other rotating and non-rotating aircraft structures having nose cones face some of the same anti-icing/de-icing difficulties as illustrated above with respect to RATs. Furthermore, as a general matter, such difficulties can similarly be faced by a variety of devices exposed to a fluid stream in which temperature affects operating performance. Accordingly, it is an object of this invention to provide an improved arrangement for applying heat to external aircraft structures. Other objects include providing:

1. an arrangement for preventing ice accretion on aircraft RATs over an extended period of operation in an emergency environment, 2. a lightweight and inexpensive device for heating structures exposed to a fluid stream, 3. a reliable anti-icing/de-icing structure which can be readily incorporated into existing RAT designs without significantly increasing RAT weight or size, 4. a self-contained apparatus for heating external aircraft components which does not require a supplemental power supply, 5. a new and improved RAT, and 6. a self-contained arrangement for generating heat to be applied to external surfaces, such as nose cones, exposed to an airstream which is reliable under emergency operating conditions of aircraft and maintenance free during long periods of stowage between emergency uses.

These and other objects of the present invention are attained by apparatus for providing heat by electromagnetic induction between relatively rotating components. In RAT applications, part of the nose cone is formed from electrically conductive material which is in thermally conductive relation to the nose cone exterior. A magnetic field is created by components that are spaced apart from the electrically conductive material and relatively rotatable with respect to that material. The electrically conductive material intersects the magnetic field, at least in part, such that electrical currents, such as eddy currents, are created in the electrically conductive material by relative rotation with respect to the magnetic field. These eddy currents create heat which is conducted to the exterior surface of the RAT nose cone. Preferably, the magnetic field is created by pairs of spaced-apart permanent magnets mounted on a support plate inside the RAT hub and immediately behind the nose cone. The effect of the magnetic field in heating the nose cone can be increased by use of magnetically permeable material to form the support plate and/or part of the nose cone adjacent or integral with the electrically conductive material.

Other objects, advantages and novel features of the present invention will now become readily apparent upon consideration of the following drawings and detailed description of preferred embodiments.

DESCRIPTION OF THE DRAWINGS

FIG. 9 illustrates an alternate embodiment of the invention utilizing radially directed magnetic pole pieces;

FIG. 10 illustrates an alternate embodiment of the invention in conjunction with a non-metallic nose cone;

FIG. 11 illustrates another alternate embodiment of the invention incorporating a magnetically permeable element to enhance the performance of the anti-icing/deicing apparatus of the invention;

FIG. 11a is a schematic representation of the change in the magnetic flux path produced by the embodiment of FIG. 11;

FIG. 12 illustrates an embodiment of a nose cone combining the embodiments of FIG. 10 and FIG. 11;

DESCRIPTION OF PREFERRED EMBODIMENTS

Figure 1:
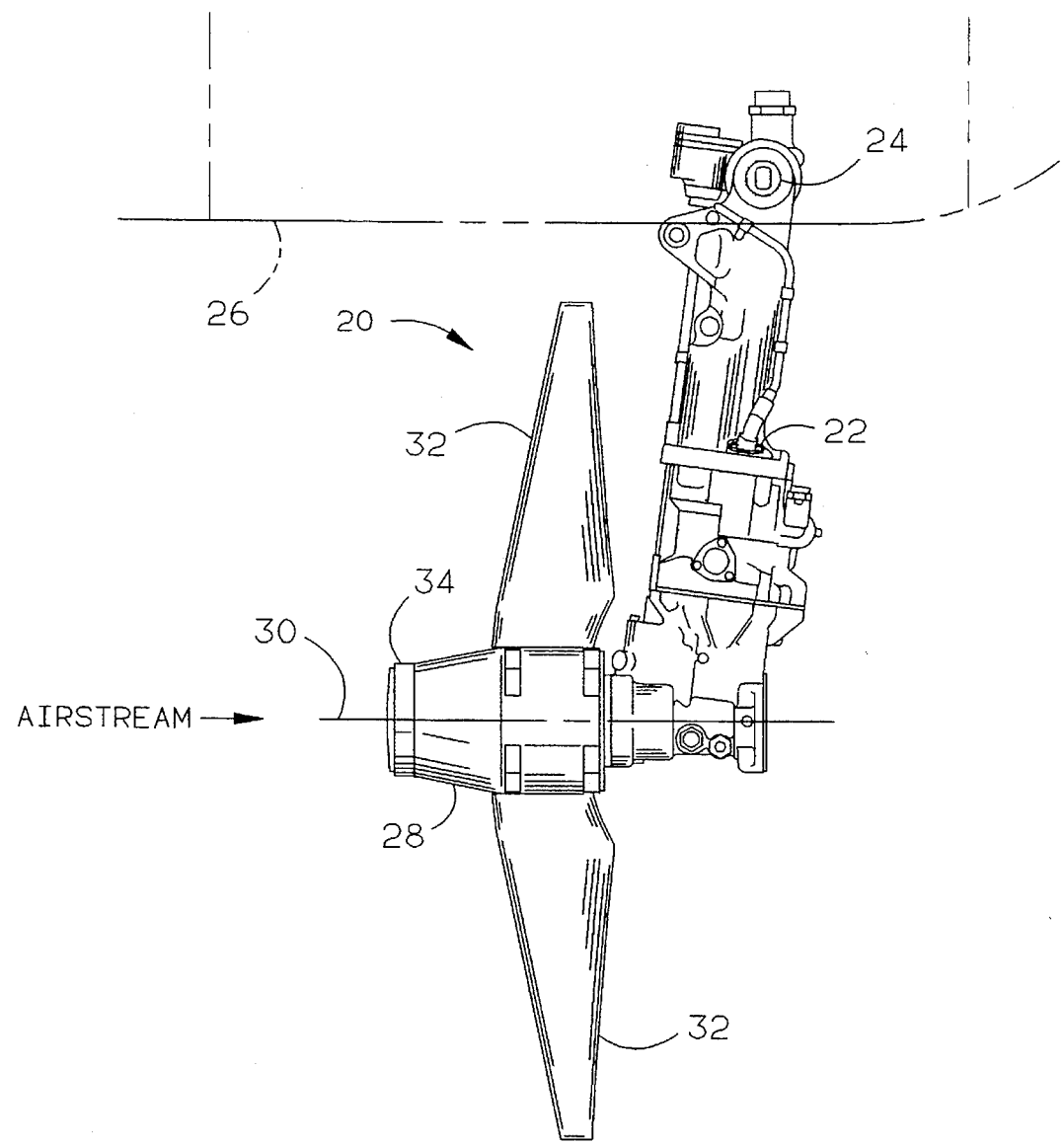
FIG. 1 illustrates a ram air driven turbine (RAT) incorporating an anti-icing/deicing apparatus of the present invention.
Figure 2:
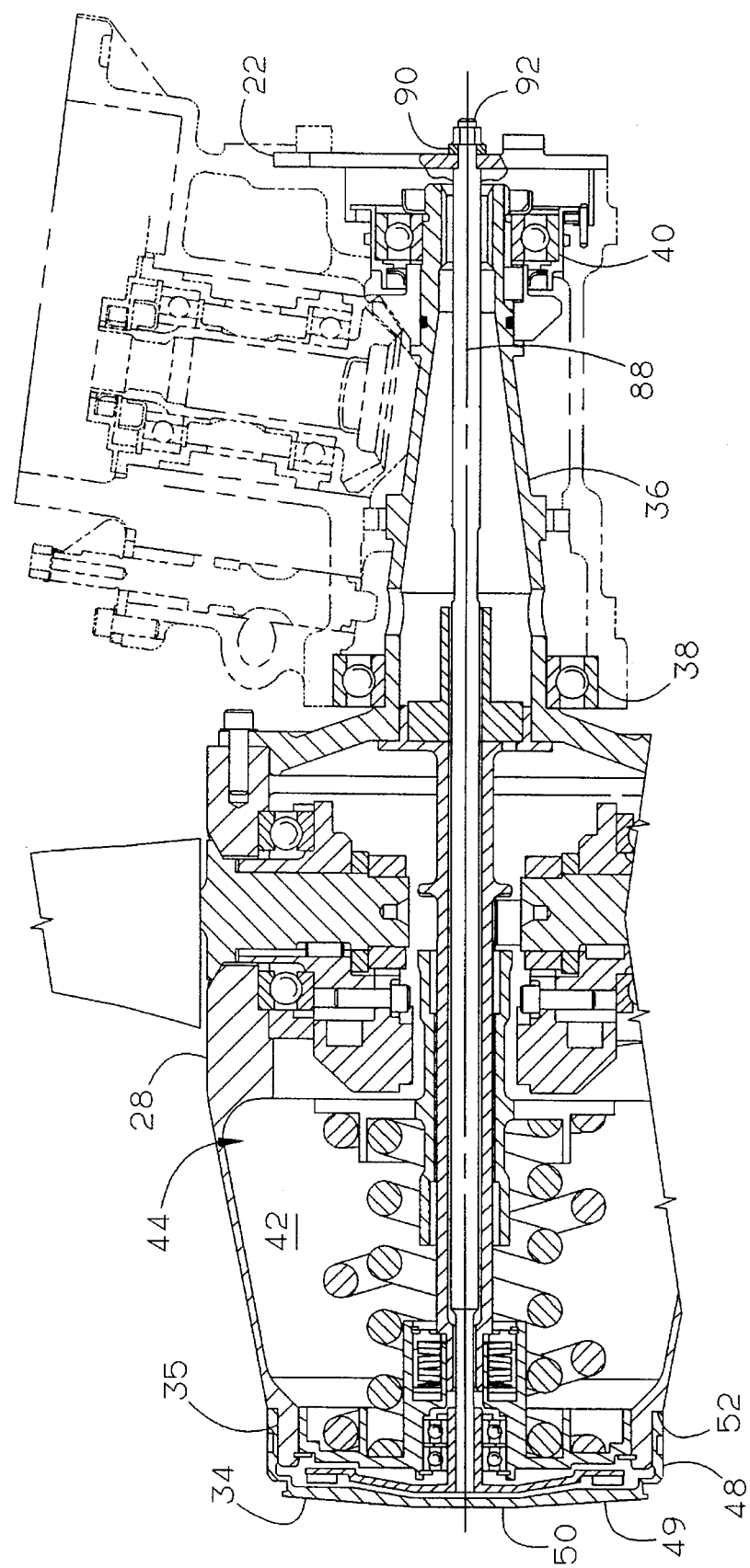
FIG. 2 is a longitudinal cross-sectional view of the RAT turbine blade hub assembly of FIG. 1.
Figure 3:
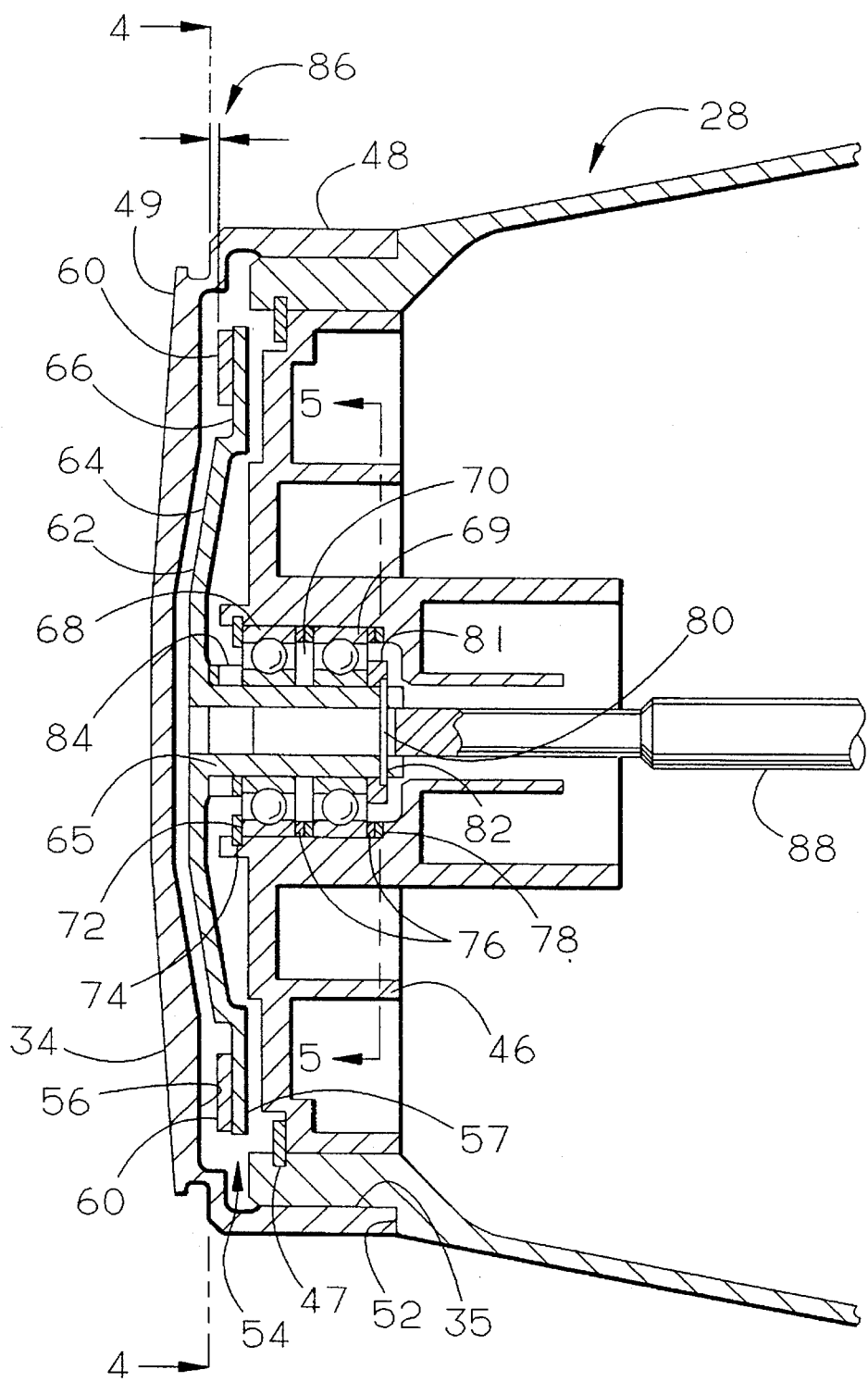
FIG. 3 is an enlarged view of a forward portion of FIG. 2.
Figure 4:
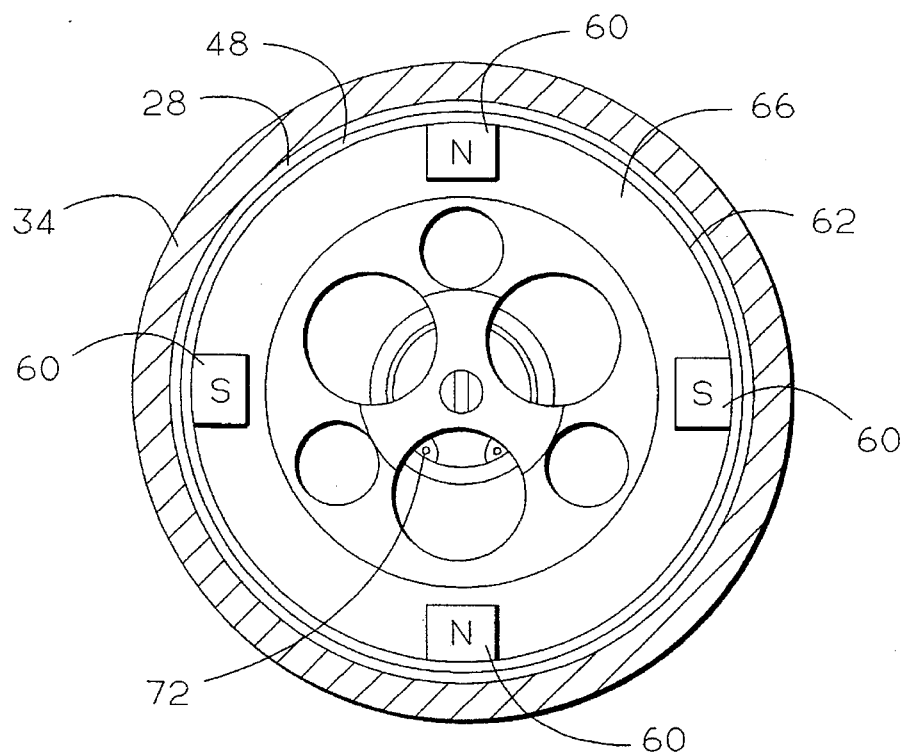
FIGS. 4 and 5 are taken along Line 4—4 and Line 5—5 of FIG. 3.

FIGS. 1–3 show a preferred embodiment of a RAT incorporating the teachings of the present invention to prevent the build up of ice. This RAT is employed as an emergency power unit for an aircraft. However, it is specifically noted that the teachings of the present invention are not limited to use only in RATs.

From FIG. 1, the illustrated RAT 20 includes a support structure in the form of strut 22. That strut is pivotally attached at one end 24 within a RAT stowage compartment of the aircraft, indicated schematically by dashed lines 26. At the opposing, distal end of strut 22 a rotary device, in the form of turbine blade hub assembly 28 is mounted for rotation about axis 30. That axis is, for example, substantially parallel to the flow of fluid, in this case the airstream exterior of the aircraft, past RAT 20. A pair of turbine blades 32 are mounted to hub 28 and extend radially outward therefrom in a manner allowing blades 32 to convert energy from the airstream directed past blades 32 into mechanical torque. The torque is applied to hub 28 at the point of attachment of blades 32, thereby causing hub 28 to rotate about axis 30. Nose cone 34 is mounted on the forward end of hub 28, thus being the lead portion of RAT 20 in contact with the airstream.

As best seen in FIG. 2, a shaft 36 extending from the downstream or rear end of hub 28 is journaled for rotation within a forward and an aft shaft support bearing 38, 40 which are mounted in the distal end of strut 22. Hub 28 is preferably annular in construction and defines an internal cavity 42 which houses a number of elements, including springs, flyweights, and cam followers, which in combination comprise a mechanical blade pitch control and speed governing system, generally indicated as 44 in FIG. 2.

With reference to FIG. 3, hub 28 also includes at a forward axial end thereof an end cap 46 which is removable to allow installation of elements included in pitch control and speed governing system 44. End cap 46 is axially positioned within internal cavity 42 of the hub 28 by a snap ring 47.

At an upstream or forward axial end of hub 28, a nose cone 34 is provided which is constructed of an electrically conductive material such as aluminum or copper and fixedly attached to hub 28 for rotation therewith by a threaded joint, as indicated at 35. Nose cone 34 of the exemplary embodiment is generally configured as a right circular cylinder having an axially extending annular wall 48 closed at an upstream axial end thereof by an imperforate, radially extending end wall 49. End wall 49 has, for example, an upstream facing surface thereof defining a leading surface 50 of nose cone 34. Leading surface 50 of nose cone 34 is transverse to axis 30 and to the fluid flow of the airstream past RAT 20 and it is known to be susceptible to the accretion of ice when the RAT 20 is operated under icing conditions without use of the present invention. A portion of the inner surface of the annular wall 48 of nose cone 34 is threaded to mate with a threaded portion of the outer surface of hub 28 thereby allowing nose cone 34 to be fixedly attached to hub 28 at the upstream end thereof as previously described and indicated at 35. Axial positioning of nose cone 34 is accomplished by threading nose cone 34 onto the hub until the aft end of the nose cone bottoms against a shoulder 52 of hub 28.

The axial length of annular wall 48 of the nose cone is selected such that with the aft end of the nose cone 34 bottomed against the shoulder 52, a forward cavity 54 is provided between the inner surface 56 of end wall 49 of nose cone 34 and the axially facing outer surface 57 of end cap 46 of the hub 28. Located within this cavity 54 are magnetic field producing means in the form of one or more pairs of permanent magnet pole pieces 60 attached to a yoke 62 of magnetically permeable material. Yoke 62 of the exemplary embodiment is configured as a radially extending annular flange or disk 64 disposed about axis 30 and having an annular yoke shaft 65 extending axially in the aft direction from the annular flange 64. The yoke shaft 65 is supported by a pair of yoke support bearings 68, 69 which are housed in a bearing cavity 70 of end cap 46 and retained within the bearing cavity by a C-ring 72. This C-ring is installed in a groove 74 in wall of bearing cavity 70 in such a manner as to bear against an outer race of the forward yoke support bearing 68. A series of shim washers 76 are provided between forward and aft yoke support bearing 68, 69 and between aft yoke support bearing 69 and a shoulder 78 at the aft end of bearing cavity 70 to allow the axial position of aft yoke support bearing 69 to be adjusted. Yoke 62 is secured axially by a pin 80 inserted through a cross-drilled hole 82 which extends through the yoke shaft at a point aft of aft yoke support bearing 69. A retaining washer 81 having an aft extending axially oriented annular rim for retaining pin 80 in the cross-drilled hole 82 is provided between the radially extending ends of the pin 80 and the inner race of the aft yoke support bearing 69. A wavy spring 84 is provided between the inner race of forward yoke support bearing 68 and annular flange 64 of yoke 62 to urge pin 80 into intimate axial contact with retaining washer 81 and retaining washer 81 into intimate axial contact with the inner race of aft yoke support bearing 69.

This exemplary embodiment of RAT 20 utilizes two pairs of pole pieces 60 attached to a forward facing surface 66 of flange 64 and preferably (but not necessarily) shielded from the fluid stream by the nose cone and hub. The pole pieces 60 preferably are arrayed in an equally spaced circular pattern centered about axis 30. Pole pieces 60 are attached to forward face such that their N-S pole faces are oriented in an axial facing direction with adjacent pole pieces 60 having opposite N-S polarities at their respective forward facing distal ends. It will be appreciated by those skilled in the art that by virtue of the overall construction and mounting of yoke 62 of the preferred embodiment, and by adjusting the number and the thicknesses of shim washers 76 located forward and aft of the aft yoke support bearing 69, the axial width of an air gap 86 between faces of the pole pieces 60 and the inner surface of the end wall 56 may be accurately adjusted and controlled.

Figure 6:
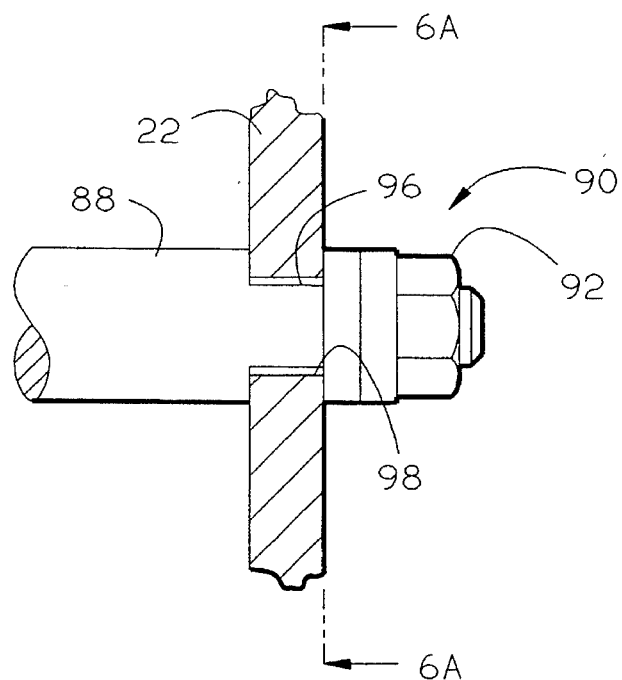
FIG. 6 is an enlarged partial view of a rear portion of FIG. 2 to illustrate specific features of the exemplary embodiment of the invention.
Figure 5:
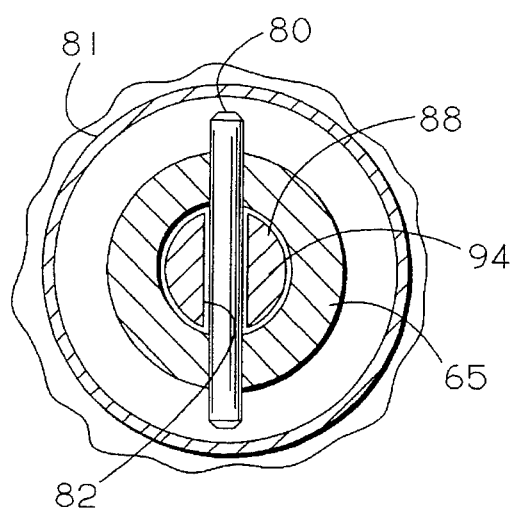
Figure 6A:
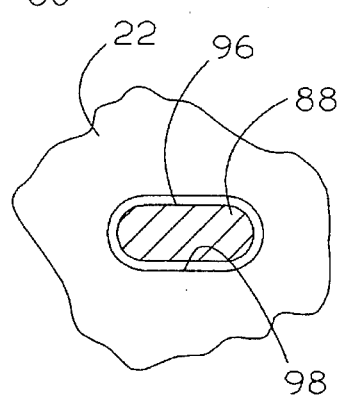
FIG. 6a is a partial cross sectional view taken along Line 6a—6a of FIG. 6.

RAT 20 also includes means for fixedly attaching yoke shaft 65 to strut 22 in the form of a rod 88 which passes through hub 28 along axis 30, with rod 88 having a threaded end 90 fixedly attached to strut 22 by a nut 92. As illustrated in FIGS. 6 and 6a, rod 88 of the exemplary embodiment further includes a flattened segment 96 forward of threaded end 90. Flattened segment 96 engages corresponding flats 98 in strut 22 thereby preventing the rod 88 and from rotating with respect to strut 22. As illustrated in FIGS. 3 and 5, the distal end 94 of rod 88 is bifurcated to engage pin 80 in yoke 62 and to thereby prevent rotation of yoke 62 about axis 30.

Figure 8:
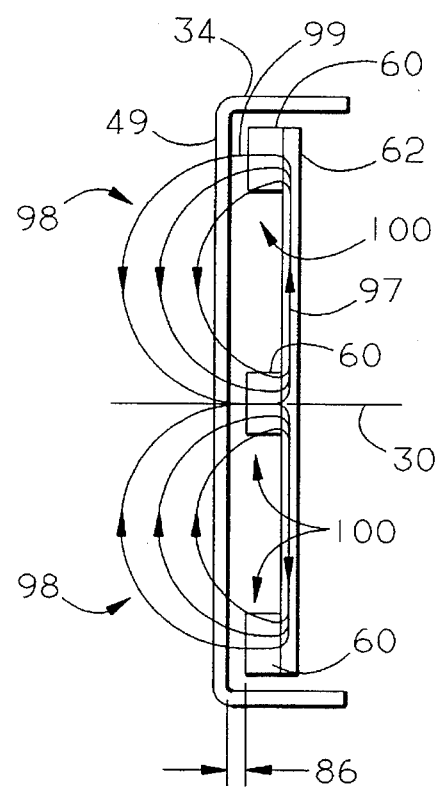
FIGS. 7 and 8 are schematic representations of magnetic fields provided by the magnetic field producing means of the exemplary embodiment of FIG. 1.
Figure 7:
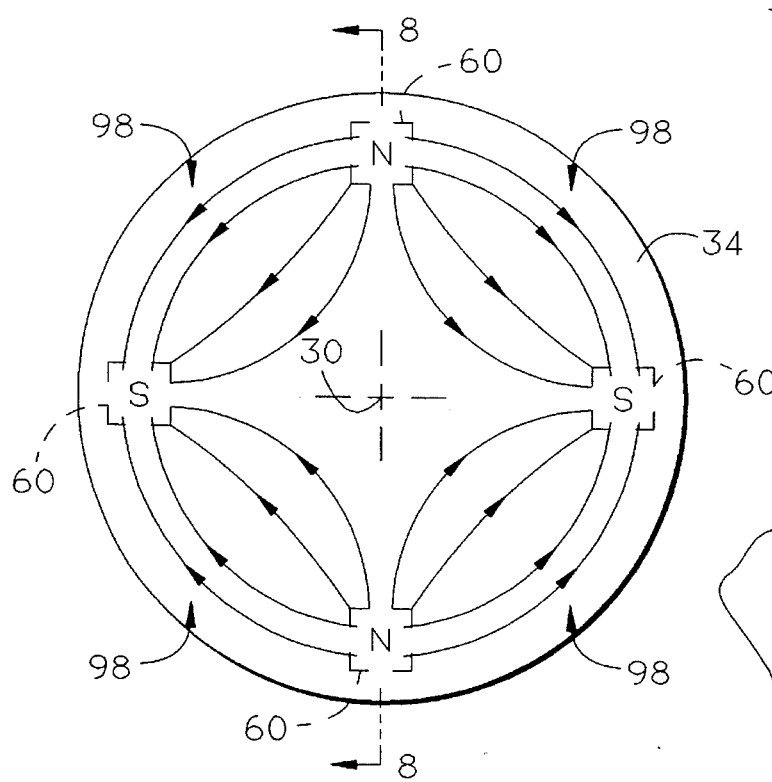

As illustrated by simplified schematic representations in FIGS. 7 and 8, pole pieces 60 and the manner in which pole pieces 60 are attached to yoke 62 as previously described herein with respect to the exemplary embodiment provide an effective means for establishing a series of magnetic fields, generally indicated by flux lines 98, between adjacent pole pieces 60 which have opposite N-S pole orientations. By virtue of the axial facing N-S pole face orientation of the pole pieces 60 of the exemplary embodiment, flux lines 98 emanate in a generally axial direction from the N-pole faces of the pole pieces 60 and return to the S-pole face of an adjacent pole piece 60 thereby creating a magnetic flux field extending axially some distance forward and aft of pole pieces 60. A portion of this magnetic field, as generally indicated at 100 in FIG. 8, extends in an axial direction with a forward extending portion 99 of that field extending across air gap 86 and through end wall 49 of nose cone 34. End wall 49 of the nose cone 34 of the exemplary embodiment, which as previously described herein is constructed of an electrically conductive material such as aluminum or copper, functions as an electrical armature disposed in the forward extending magnetic field 99 produced by pole pieces 60.

When RAT 20 of the exemplary embodiment is deployed into an airstream, blades 32 cause hub 28 and nose cone 34 to rotate about axis 30. This creates relative motion between the armature, in the form of end wall 49 of nose cone 34, and the magnetic field producing means, in the form of pole pieces 60 which are constrained from rotating by yoke 62 and rod 88 which is fixedly attached to strut 22.

Specifically, end wall 49 is caused to rotate through forward extending portion 99 of the magnetic field in a direction generally perpendicular to the axially extending portion 100 of the magnetic field. This relative motion induces a flow of electric current, such as, for example, eddy currents in the wall 49 as a result of electromagnetic induction. These electric currents produce heat as they circulate within end wall 49 which is utilized to prevent an accretion of ice from forming on leading surface 50 of nose cone 34.

It should be noted that if a magnetically permeable material, such as steel, is used in constructing yoke 62, aft extending portion 97 of magnetic field 98 is provided with a low reluctance path between pole pieces 60. This causes an increase in flux density in forward extending portion 99 of magnetic field 98 which is manifested in increased performance of the anti-icing/deicing apparatus of this exemplary embodiment of RAT 20. Utilization of a magnetically permeable material for yoke 62 of RAT 20 provides an additional benefit in that the yoke also functions as magnetic shield to substantially absorb what would be the aft extending portion of magnetic field 98, thereby precluding the generation of unwanted eddy currents and heat in components such as end cap 46 or other components of the hub 28 which might be fabricated from an electrically conductive material.

Prototype testing of a RAT incorporating the present invention has been conducted. It has been found that when the hub assembly was operated under icing conditions without an anti-icing/deicing apparatus of the instant invention, an accretion of ice quickly formed on the nose cone of the RAT. In some cases a generally discoidal shaped block of ice approximately three inches in axial length formed on the nose cone before breaking away in chunks or as a single solid disk of ice.

It has been found that the shape and density of the ice disk and any ice pieces breaking away therefrom were highly dependent upon the ambient temperature. Colder ambient temperatures tended to produce an ice disk which was very hard and dense, and which typically tended to break away as a single solid disk. Warmer ambient temperatures tended to produce a softer ice disk which exhibited a general tendency to break away in pieces. When the same hub assembly was operated under identical icing conditions with the anti-icing/deicing apparatus of the instant invention installed, however, no accretion of ice whatsoever was observed on the nose cone during operation for extended periods under the icing conditions.

From the description of the exemplary embodiment and the test results provided herein, those skilled in the art will readily recognize that the instant invention provides a simple, cost efficient, weight efficient, and highly reliable apparatus for preventing an accretion of ice from developing on a nose cone, or for removing an existing accretion of ice from the nose cone of a device. Those skilled in the art will also recognize that the instant invention may be utilized to advantage in a wide variety of devices.

In a preferred embodiment five pairs of permanent magnet pole pieces 60 were formed from samarium cobalt and mounted on yoke 62 with an air gap 86 of 0.055 ±0.010 inches from an aluminum nose cone 34 to maintain nose cone temperatures at approximately 37° F. during low temperature intermittent icing conditions of −10° F. at an airspeed of 210KEAS. Strictly speaking, however, any numbers of paired or unpaired magnets can be used as desired in any spacial orientation on yoke 62 provided that the nose cone intersects a magnetic field so as to induce heat when relative rotation occurs. This heat can be conducted through the nose cone and into the hub of RAT 20.

Those skilled in the art will further recognize that the instant invention as applied to a RAT has allowed a new and improved RAT to be produced which is capable of operating for extended periods under environmental conditions conducive to icing without incurring an accretion of ice on the nose cone of the RAT. It will also be recognized that the instant invention has provided such a new and improved RAT capable of operating for extended periods under conditions conducive to icing in a simple manner which does not significantly increase the size, weight or cost of the RAT, and in a manner which does not adversely affect reliability of the RAT.

Although the present invention has been described in considerable detail with reference to certain exemplary embodiments thereof, other embodiments are possible.

For example, although four permanent magnet pole pieces 60 were utilized to produce the magnetic field in the exemplary embodiment, a greater or lesser number of pairs of pole pieces may be utilized in order to tailor the quantity of heat produced to the requirements of a specific device or operating environment. The particular manner in which the pole pieces are arrayed on the yoke, or other support structure may also be altered to suit the requirements of each application with respect to the amount of heat needed and the stabilization temperature of the magnets selected.

It is also not a requirement of the instant invention that the pole pieces have their N-S pole faces oriented in an axial direction, or that the magnetic field produced by the pole pieces act primarily on an axially facing end wall of the nose cone. The pole pieces and the magnetic field may be oriented to produce heating in other surfaces of a nose cone to meet the needs of a specific device. In an alternate embodiment of the invention illustrated schematically in FIG. 9, the pole pieces 60 are attached to a support structure 102 with the pole faces 61 of the pole pieces 60 oriented in a radial direction and spaced radially inward from an axially extending annular wall 104 of an electrically conductive nose cone 105 by a radially extending, annular air gap 103. With this embodiment of the invention the magnetic field produced by the pole pieces will include a radially directed portion extending through the annular wall 104 of the nose cone 105. When relative rotational motion exists between the nose cone 105 and the pole pieces 60, the magnetic field will induce eddy currents in annular wall 104 with the eddy currents being converted into heat by the internal electrical resistance of the annular wall in the same manner as previously described with reference to the exemplary embodiment as illustrated in FIGS. 1–8.

Where the device having a nose cone subject to icing includes a source of electrical power, electromagnets may be utilized in place of the permanent magnets of the exemplary embodiment. Such an arrangement utilizing electromagnets as the magnetic field producing means would provide an additional advantage in that when the device was not operating under conditions conducive to icing, power to the magnets could be removed, thereby reducing power requirements for the device during operation under normal, i.e. non-icing conditions.

It is also not a requirement of the invention that the entire nose cone be constructed of an electrically conductive material. It is sufficient if only a portion of the nose cone is electrically conductive to provide the "armature" of the invention in which the magnetic field producing means may induce a flow of eddy currents. For example, in an alternate embodiment of the invention illustrated in FIG. 10, a disk 106 of electrically conductive material such as copper or aluminum is integrally attached opposite the pole pieces 60 to an outer surface of a nose cone 107 which is constructed of a non-electrically conductive material, such as a plastic, a ceramic, or a composite material, which does not block the magnetic field from pole pieces 60.

As illustrated in FIG. 11, the heating effect produced by the instant invention may also be increased without adding magnetic pole pairs. This is done by including a magnetically permeable element 114 integrally joined with a nose cone 116 of an electrically conductive material. One such suitable material for element 114 would be magnetic stainless steel. In that embodiment, the electrically conductive element of the nose cone is functioning as the armature of the invention and is disposed between pole pieces 60 and magnetically permeable element 114. The addition of the magnetically permeable element 114 provides a low reluctance return path for the magnetic field opposite the magnets, thereby reducing the air path length of the magnetic field and increasing the magnetic flux density passing through the electrically conductive element in comparison to the same nose cone without the magnetically permeable element. The reduction in path length provided by the addition of the magnetically permeable element in the manner just described may be seen by comparing the flux lines 118 and 98 for a nose cone with and without the magnetically permeable element as depicted in FIG. 11a and FIG. 8, respectively. Alternatively, the entire nose cone 116 may be constructed of a magnetically permeable material, but additional magnetic pole pairs 60 might still be needed to obtain the desired heating effect due to the relatively poor electrical conductivity of most known magnetically permeable materials.

Those skilled in the art will also readily recognize that the embodiment illustrated in FIGS. 10 and 11 may be combined to provide the embodiment illustrated in FIG. 12. In that case, a magnetically permeable element 114 is combined with an electrically conductive or non-magnetically permeable element 106 on a nose cone 120 of non-electrically conductive and non-magnetically permeable conductive material. It will be further recognized that in such an arrangement the electrically conductive element 106 must be disposed at least in part between the magnetically permeable element 114 and the magnetic field producing means 122.

Figure 13:
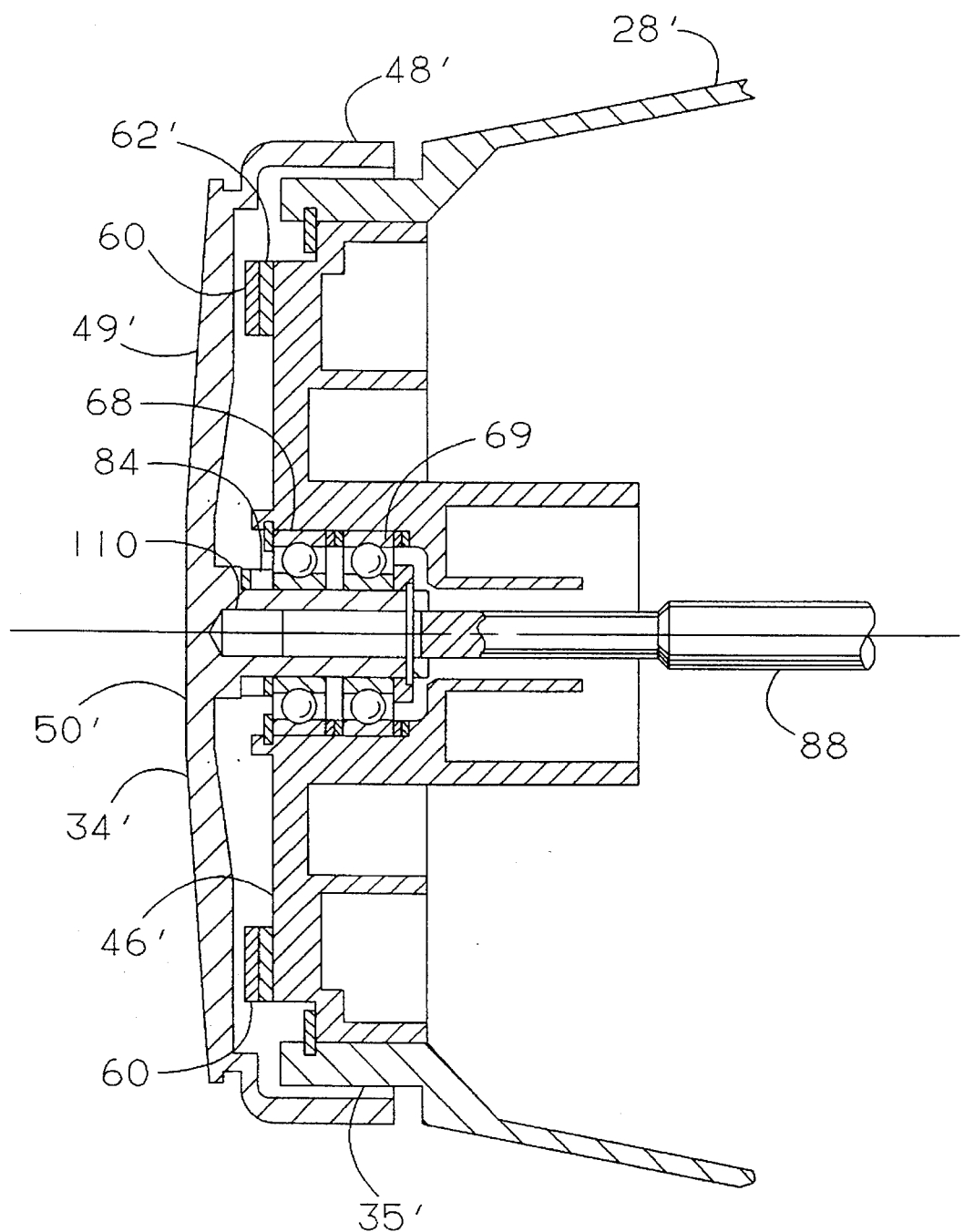
FIG. 13 illustrates an embodiment of the invention in a device having a stationary nose cone and rotating magnetic field producing means.

FIG. 13 illustrates an alternative embodiment of the invention as previously described with reference to FIG. 3. In the embodiment of FIG. 13, however, the nose cone is stationary and the magnetic field producing means are affixed to the hub for rotation therewith, in contrast to the previously described embodiment of FIG. 3 wherein the nose cone is rotating and the magnetic field producing means are stationary. Many of the components of the embodiment of FIG. 13 are identical to the components described previously with regard to the embodiment of FIG. 3. Like components have been given like reference numbers and will not be redescribed. Those components which are very similar to, or are modifications of components previously described are identified in FIG. 13 with primed reference numerals.

Specifically, in the embodiment of the invention as depicted in FIG. 13, pole pieces 60 are mounted on an annular washer-shaped yoke 62' of magnetically permeable material which is fixedly attached to a forward facing axial surface of a removable end cap 46' of a hub 28' for rotation therewith about axis 30. A nose cone 34' includes an axially extending annular wall 48' closed at an upstream axial end thereof by an imperforate radially extending end wall 49' having an upstream facing surface thereof defining a leading surface 50' of the nose cone 34'. In contrast to the embodiment of the invention depicted in FIG. 3, however, neither annular wall 48' nor hub 28' are threaded to allow the nose cone 34' to be fixedly attached to one another. In fact, nose cone 34' and hub 28' are configured so as to provide a space therebetween as indicated at 35'. An annular nose cone shaft 110, which is the equivalent of yoke shaft 65 of the embodiment of FIG. 3, extends in an aft direction from nose cone 34' and is supported and retained within forward and aft support bearings 68, 69 in a manner identical to the support and retention means previously described for retaining yoke 62 in the embodiment of FIG. 3. Means for fixedly attaching nose cone 34' to strut 22 are provided by rod 88 in the same manner as previously described with regard to yoke of FIG. 3. Hub 28' and hence magnetic pole pieces 60 attached to hub 28' are therefore free to rotate about the axis 30 while nose cone 34' is prevented from rotating by virtue of the fixed attachment between nose cone 34' and strut 22 provided by the rod 88. As an alternative within this embodiment, yoke 62' may be omitted if end cap 46 is formed from magnetically permeable material.

Figure 14:
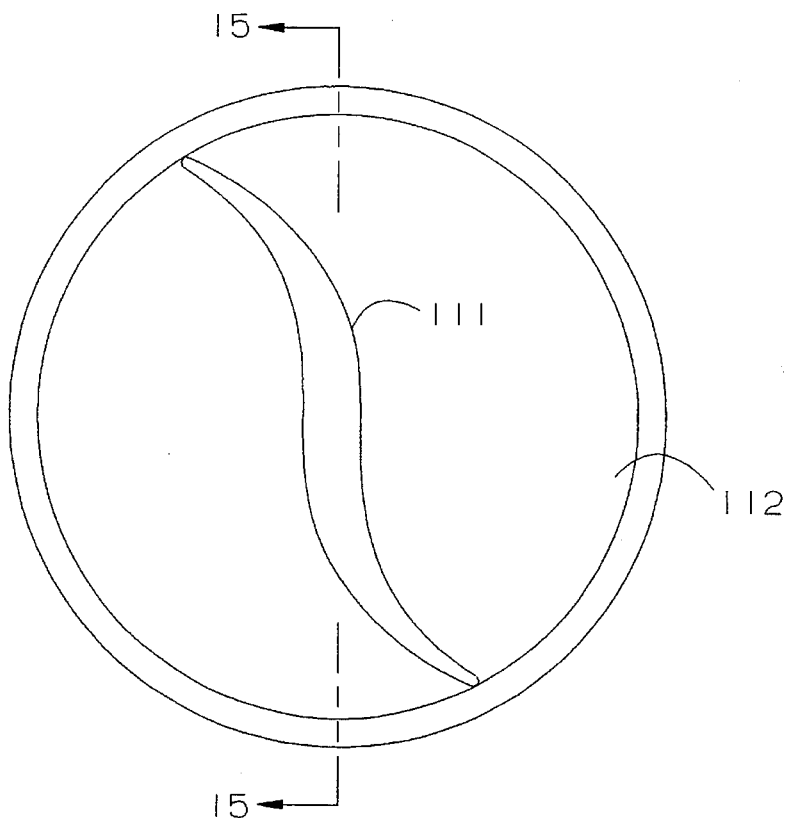
FIGS. 14 and 15 illustrate an embodiment of the invention having means affixed to the nose cone for rotating the nose cone about the axis when an airstream is directed at the nose cone.
Figure 15:
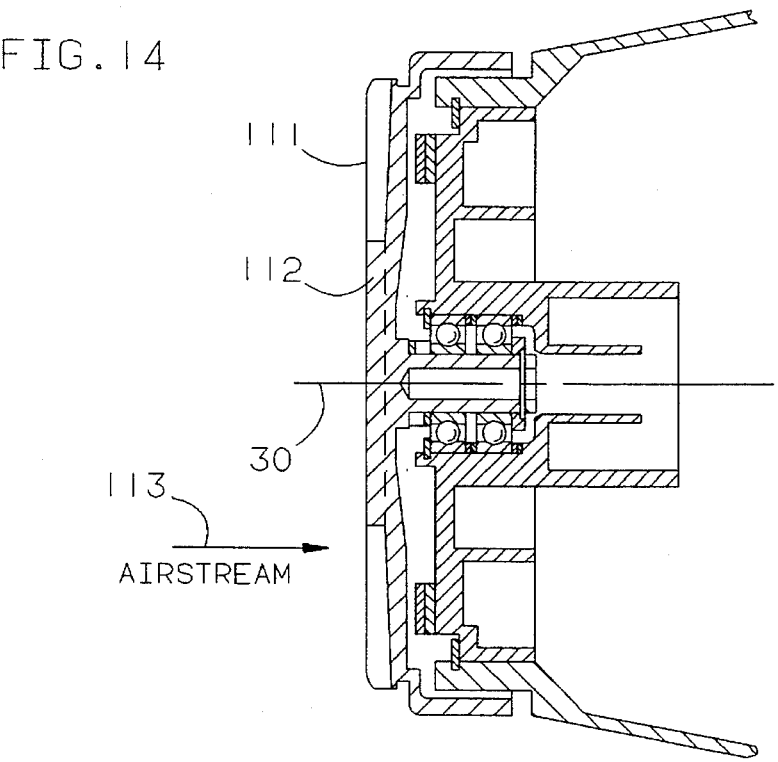

The embodiment of the invention depicted in FIGS. 14 and 15 is, for example, identical to all respects to the embodiment of FIG. 13 except that rod 88 is eliminated, and means, illustrated in the form of a fin 111 fixedly attached to a nose cone 112 is added for rotating nose cone 112 about axis 30 when an airstream 113 is directed at nose cone 112. This embodiment can find particular utility in an application of the invention in a device wherein the equivalent of the hub 28' of FIG. 13 is not rotating. Such applications might include a pod mounted on an aircraft wing or fuselage, or a non-rotating wing vortex turbine.

Those skilled in the art will recognize that although the instant invention has been described herein with respect to a number of specific embodiments and applications thereof, many other embodiments and applications of the invention are possible within the scope of the invention as described in the appended claims. It is therefore understood that the spirit and scope of the appended claims should not be limited to the specific embodiments described and depicted herein.

What is claimed is:

1. In a device having a longitudinal axis and being rotatable about the axis and having a nose cone attached at one axial end thereof, an apparatus for heating said nose cone comprising:

an armature of electrically conductive material integrally formed with said nose cone; and magnetic field producing means disposed within said device in a manner so as to produce a flow of electric currents in said armature by electro-magnetic induction when said nose cone and said magnetic field producing means are caused to rotate relative to each other about said axis.

2. The device according to claim 1 wherein said nose cone is rotatable about said axis and said magnetic field producing means is stationary with respect to said axis.

3. The device according to claim 1 wherein said magnetic field producing means is rotatable about said axis and said nose cone is stationary with respect to said axis.

4. The device according to claim 1 wherein said magnetic field producing means includes at least one permanent magnet attached to a yoke of magnetically permeable material.

5. The device according to claim 1 wherein said nose cone also includes an integrally formed portion made of magnetically permeable material.

6. The device according to claim 1 wherein said nose cone also includes a portion formed from magnetically permeable material disposed adjacent said electrically conductive material.

7. An apparatus for translating mechanical energy to thermal energy for heating the surface of a device immersed in a fluid stream, that translation occurring through the use of electromagnetic induction, said apparatus comprising:

a first part and a second part, those parts being relatively rotatable with respect to each other about a rotational axis;

said first part including a disk-like portion formed from electrically conductive material and disposed adjacent said surface so as to be in thermal conductive relation thereto;

said second part including a support structure and at least two permanent magnets mounted in spaced apart relation on said support structure;

said support structure being disposed with respect to said disk-like portion such that said magnets are adjacent and spaced apart from said disk-like portion with said disk-like portion intersecting the magnetic field produced by said magnets; and blade means for causing said relative rotation of said first and second parts in response to the flow of fluid in said fluid stream.

8. In a device having an axis of rotation and a nose cone attached at one axial end of thereof, an apparatus for heating the nose cone, the apparatus comprising:

a. an armature of electrically conductive material integral with the nose cone; and b. magnetic field producing means disposed within the device in a manner to produce a flow of eddy currents in the armature by electromagnetic induction when the nose cone and the magnetic field producing means are caused to rotate relative to one another about the axis of rotation.

9. The apparatus of claim 8 wherein the magnetic field producing means includes a pair of permanent magnetic pole pieces attached to a yoke of magnetically permeable material.

10. The apparatus of claim 8 wherein the nose cone is rotatable about the axis and the magnetic field producing means are stationary with respect to the axis of rotation.

11. The apparatus of claim 10 wherein the nose cone includes means for rotating the nose cone about the axis of rotation when an airstream is directed at the nose cone.

12. A ram air driven turbine comprising:

a. a support structure;

b. a hub mounted on the support structure in a manner allowing the hub to rotate about an axis;

c. one or more blades attached to the hub in a manner allowing the blades to rotate the hub about the axis when a flow of ram air is directed through the blades;

d. a nose cone attached to the ram air driven turbine at an axial end of the hub, the nose cone including an electrically conductive element; and e. magnetic field producing means disposed within the hub in a manner to produce a flow of electric currents in the electrically conductive element by electromagnetic induction when the hub is rotated about the axis so as to heat said nose cone.

13. The ram air driven turbine of claim 12 wherein the nose cone is fixedly attached to the hub for rotation about the axis and the magnetic field producing means are stationary with respect to the axis.

14. The ram air driven turbine of claim 12 wherein the nose cone is stationary with respect to the axis and the magnetic field producing means are attached to the hub for rotation about the axis.

15. The ram air driven turbine of claim 14 including means for fixedly attaching the nose cone to the support structure, that means having a rod passing through the hub along the axis with the rod being fixedly attached at a first end to the support structure and fixedly attached at a distal end to the nose cone.

16. The ram air driven turbine of claim 11 wherein the electrically conductive element is constructed from a magnetically permeable material.

17. A rotary device comprising:
   a. a hub rotatable about an axis;
   b. one or more blades attached to the hub in a manner allowing the blades to rotate the hub about the axis;
   c. a nose cone attached to the rotary device at an axial end of the hub, the nose cone including integral therewith an electrically conductive element; and
   d. magnetic field producing means disposed within the hub in a manner to produce a flow of electric currents in the electrically conductive element by electromagnetic induction when the hub is rotated about the axis.

18. The rotary device of claim 17 wherein the magnetic field producing means includes a pair of permanent magnetic pole pieces attached to a yoke of magnetically permeable material.

19. The rotary device of claim 17 further including a magnetically permeable element integral with the nose cone.

20. In a device defining an axis of rotation and having a nose cone attached at one axial end thereof, a method for preventing an accretion of ice on a nose cone, the method comprising the steps of:
   a. providing an electrically conductive element within the nose cone;
   b. providing magnetic field producing means which is disposed within the device in a manner to produce a magnetic field which intersects the electrically conductive element; and
   c. causing the nose cone and magnetic field producing means to rotate relative to one another about the axis of rotation so as to produce eddy currents in the electrically conductive element by electromagnetic induction.

21. In an aircraft having a ram air turbine device for generating supplemental power, that ram air turbine including a support structure, a hub rotatably mounted with respect to said support structure, and blades mounted on said hub to transmit rotational force thereto, and said ram air turbine being attached to said aircraft so as to extend into the surrounding airstream during use of said ram air turbine, the improvement comprising means for preventing ice build up on at least portions of said ram air turbine via generation of eddy currents in electrically conductive surfaces of said ram air turbine.

22. The aircraft according to claim 21 wherein said ram air turbine includes a forward end portion on said hub which is exposed to ice accretion, said hub includes at least a portion thereof formed from electrically conductive material, magnetic field producing means are provided on said support structure so as to create a magnetic field which intersects said electrically conductive material so as to create said eddy currents upon rotation of said hub.

23. The aircraft according to claim 22 wherein said magnetic field producing means includes at least a pair of permanent magnets mounted on a surface which is spaced apart from said electrically conductive material.

24. The aircraft according to claim 22 wherein a surface of magnetically permeable material is mounted adjacent said electrically conductive material so as to increase the magnetic flux density therethrough.

* * * * *